Feb. 26, 1929.
O. T. BLÁTHY
1,703,810
ROTATING FIELD MAGNET FOR TURBOGENERATORS
Original Filed Jan. 14, 1927
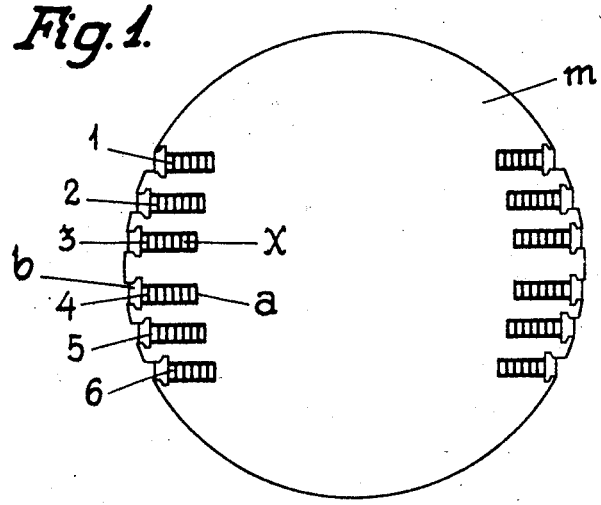
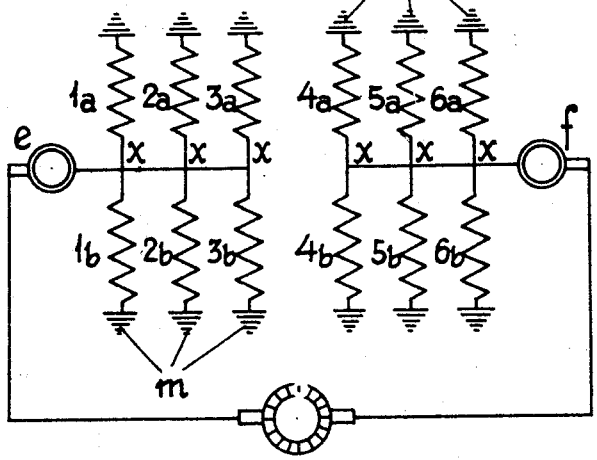
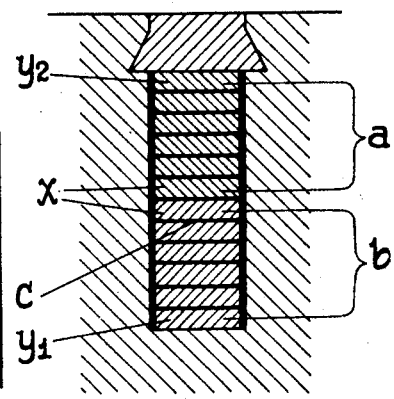
Inventor:
O. T. Bláthy, Patented Feb. 26, 1929.

1,703,810

UNITED STATES PATENT OFFICE.

OTTO TITUS BLÁTHY, OF BUDAPEST, HUNGARY.

ROTATING FIELD MAGNET FOR TURBOGENERATORS.

Original application filed January 14, 1927, Serial No. 161,212, and in Hungary May 26, 1926. Divided and this application filed September 20, 1928. Serial No. 307,286.

This application is a division of my application Serial No. 161,212, filed Jan. 14, 1927.

The invention relates to a rotating field magnet for turbogenerators in which the field winding consists of more than two coils wound of bare metal strip and placed in slots of the iron magnet core, said slots being closed by metal wedges.

The invention relates more especially to an arrangement according to which the field coils are connected in multiple at their inner ends and conveniently each half of the number of coils is connected to a common line conductors so that the outer ends of all the coils can be in electroconductive contact with the iron core of the field magnet.

According to the invention, the winding is subdivided in each slot in radial direction, into two parts wound in opposite sense in such a manner, that the two parts of the winding are connected at their ends situated in the middle of the slot to the line conductor, while the two external turns situated at the bottom of the slot and the circumference of the rotor respectively, are in metallic contact with the iron core of the rotor.

In the drawing

Figure 1 shows a two-pole field magnet according to the invention in cross section, and Figure 2 shows a circuit diagram of a rotating field magnet comprising six field coils.

Figure 3 shows a slot containing the winding according to Figure 2 in cross section.

According to Figure 1, the field winding consists of coils 1–6 which are wound of bare metal strips and are arranged in slots of the iron core $m$, with insulating layers $a$ separating the coils from the inner surface of the slot. The coils are maintained in the slots by means of metallic wedges $b$ arranged so as to close the slots.

With reference to Figure 3, the winding arranged in the slot, is subdivided in radial direction into two parts $a$ and $b$, which are wound with interposed insulation $c$, in such a manner that the sense of winding of the part $b$ adjacent to the bottom of the slot is opposite to the sense of winding of part $a$, facing the opening of the slot. The two parts $a$ and $b$ of the coil are connected in multiple at their ends $x$, situated in the middle of the slot and are connected to line conductors $e$ and $f$ respectively, common for both parts $a$ and $b$.

Hence the external turns $y_1$ and $y_2$ situated at the bottom of the slot and at the opening thereof respectively, can be in metallic contact with the iron core of the rotor. Owing to this arrangement, the transfer of heat to the iron core of the rotor is further increased.

Having now particularly described and ascertained the nature of my said invention and in what manner the same is to be performed, I declare that what I claim is:

In a rotating field magnet for turbogenerators, an iron core, two collector rings connected therewith, a plurality of slots in said iron core, coils wound of metal strips of the breadth of the slots within said slots, metallic wedges closing the circumferential openings of said slots to secure said coils in said slots, part of said coils being connected in multiple and to one collector ring at a central turn of the slot, the remaining coils being connected in multiple and to the other collector ring at a central turn of the slot, and all coils being by means of both of their outermost turns in metallic contact with said iron core.

In testimony whereof I hereunto affix my signature.

OTTO TITUS BLÁTHY.